United States Patent
deJong et al.

(10) Patent No.: US 7,530,256 B2
(45) Date of Patent: May 12, 2009

(54) CALIBRATION OF SHEET VELOCITY MEASUREMENT FROM ENCODED IDLER ROLLS

(75) Inventors: Joannes N. M. deJong, Hopewell Junction, NY (US); Lloyd A. Williams, Mahopac, NY (US)

(73) Assignee: Xerox Corporation, Norwalk, CT (US)

( * ) Notice: Subject to any disclaimer, the term of this patent is extended or adjusted under 35 U.S.C. 154(b) by 98 days.

(21) Appl. No.: 11/737,439

(22) Filed: Apr. 19, 2007

(65) Prior Publication Data

US 2008/0258382 A1    Oct. 23, 2008

(51) Int. Cl.
*G01P 21/00* (2006.01)
(52) U.S. Cl. ............................................. 73/1.37
(58) Field of Classification Search ............ 73/1.37; 399/68; 271/227, 228
See application file for complete search history.

(56) References Cited

U.S. PATENT DOCUMENTS

| | | | | |
|---|---|---|---|---|
| 4,327,878 | A * | 5/1982 | Fauchier et al. ............ | 242/543 |
| 4,774,446 | A * | 9/1988 | Salazar et al. ............. | 318/561 |
| 5,094,442 | A | 3/1992 | Kamprath et al. .......... | 271/227 |
| 5,150,115 | A | 9/1992 | deJong et al. .......... | 340/870.31 |
| 5,613,675 | A * | 3/1997 | Kruger et al. ............. | 271/270 |
| 5,678,159 | A | 10/1997 | Williams et al. ........... | 399/395 |
| 5,697,608 | A | 12/1997 | Castelli et al. ............. | 271/228 |
| 5,697,609 | A | 12/1997 | Williams et al. ........... | 271/228 |
| 5,715,514 | A | 2/1998 | Williams et al. ........... | 399/395 |
| 6,059,284 | A | 5/2000 | Wolf et al. .................. | 271/227 |
| 6,201,361 | B1 * | 3/2001 | Muller ...................... | 318/68 |
| 6,374,075 | B1 | 4/2002 | Benedict et al. ........... | 399/395 |
| 6,533,268 | B2 | 3/2003 | Williams et al. ........... | 271/228 |
| 6,575,458 | B2 | 6/2003 | Williams et al. ........... | 271/228 |
| 6,578,844 | B2 | 6/2003 | Acquaviva et al. ......... | 271/228 |
| 6,736,394 | B2 | 5/2004 | Herrmann et al. .......... | 271/249 |
| 6,736,561 | B2 | 5/2004 | Castelli et al. ............. | 400/645 |
| 6,866,260 | B2 | 3/2005 | Williams et al. ........... | 271/227 |
| 7,090,215 | B2 | 8/2006 | Mandel et al. ............. | 271/273 |
| 7,123,873 | B2 | 10/2006 | deJong et al. ............. | 399/381 |
| 7,243,917 | B2 * | 7/2007 | Knierim et al. ............ | 271/228 |
| 2003/0020230 | A1 | 1/2003 | Williams et al. ........... | 271/227 |
| 2003/0020231 | A1 | 1/2003 | Williams et al. ........... | 271/227 |
| 2003/0146567 | A1 | 8/2003 | Williams et al. ........... | 271/249 |
| 2004/0251607 | A1 | 12/2004 | Mandel et al. ............. | 271/220 |
| 2005/0263958 | A1 | 12/2005 | Knierim et al. ............ | 271/272 |
| 2006/0039728 | A1 | 2/2006 | deJong et al. ............. | 399/381 |

(Continued)

*Primary Examiner*—Hezron Williams
*Assistant Examiner*—Tamiko D Bellamy
(74) *Attorney, Agent, or Firm*—Oliff & Berridge PLC

(57) ABSTRACT

A system and method are provided to calibrate a sheet velocity measurement derived from a drive nip system incorporating idler encoders. Testing has found that the velocity from an idler encoder system is subject to systematic errors, for example, errors that occur when the system is running media of different thicknesses. The system uses one or more nips with encoders mounted on the idlers and a number of point sensors that are spaced apart in the process direction. The point sensors are used to measure the transmit time of the sheet (lead edge or trail edge) between two sensor positions. The transit time is used to calculate the average sheet velocity. The average sheet velocity is compared with the velocity derived from the idler-encoders to derive a correction factor. The velocity sensor are used to calibrate the idler-encoder velocity sensors, providing a worthwhile improvement to idler-encoder technology for media handling (e.g., feeding, transport, and finishing) in direct marking systems.

20 Claims, 7 Drawing Sheets

U.S. PATENT DOCUMENTS

| | | | |
|---|---|---|---|
| 2006/0163801 A1 | 7/2006 | dejong et al. | 271/227 |
| 2006/0208416 A1 | 9/2006 | dejong et al. | 271/228 |
| 2006/0239733 A1 | 10/2006 | Choi et al. | 399/396 |
| 2007/0023994 A1 | 2/2007 | Mandel et al. | 271/226 |
| 2007/0025788 A1 | 2/2007 | deJong et al. | 399/388 |
| 2007/0172296 A1* | 7/2007 | Igarashi | 400/625 |
| 2008/0101813 A1* | 5/2008 | Maul et al. | 399/68 |

* cited by examiner

CALIBRATION OF SHEET VELOCITY MEASUREMENT FROM ENCODED IDLER ROLLS

BACKGROUND

The exemplary embodiments generally relate to xerographic marking and devices, and specifically relate to media handling, such as feeding, transport, and finishing.

Various systems and methods for automatic sheet registration, including sheet deskewing, are known in the art. One such system and method is described in U.S. Publication No. 20055/0263958 for Knierim et al. for controlling, correcting, or changing the orientation and position of sheets traveling in a sheet transport path. The sheets include those being printed in a reproduction apparatus, which may include sheets being fed for printing, sheets being re-circulated for second side (duplex) printing, and/or sheets being output to a stacker, finishers or other output or module.

The related art discussed below demonstrates the long-standing efforts in this technological art for more effective sheet registration for xerographic devices, such as printers, copiers, facsimile devices, scanners, and the like. The related art includes translation electronic registration (TELER or ELER) sheet deskewing and/or side registration systems, such as U.S. Pat. No. 6,575,458 to Williams et al., and U.S. Pat. No. 6,736,394 to Herrmann et al. In either ELER or TELER systems, initial or incoming sheet skew and position may be measured with a pair of lead edge sensors, and then two or more ELER or TELER drive rollers may be used to correct the skew and process direction position with an open loop control system in a known manner. The drive rollers have two independently driven, spaced apart, inboard and outboard nips. Some ELER systems use one servomotor for process direction correction and another motor (e.g., a stepper motor) for the differential actuation for skew correction, as variously shown in U.S. Pat. Nos. 6,575,458 and 6,535,268 to Williams et al. Other ELER systems have separate servo or stepper motors independently driving each of the two laterally spaced drive nips for process direction registration and sheet skew registration.

Many sheet transport systems including most TELER and ELER systems use a frictional force drive nip to impart velocity to a sheet. Typically, a nip consists of a motor driven elastomeric surface wheel or "drive roller" and a backup wheel or "idler roller" that is spring loaded against the drive roller to provide sufficient normal force for a normally non-slip drive of the sheet. A well known example of the drive roller surface is a urethane material. In contrast, the idler roller (wheel) is usually a hard substantially inelastic material (metal or hard plastic). The angular velocity of the drive nip has typically been measured with the encoder mounted on either the drive nip, or on the servo or stepper motor driving the drive roll directly or through a transmission as in a timing belt drive.

Many paper registration systems in printers use two drive nips (inboard and outboard nips) as part of the paper path delivering the sheet from an input location to an image transfer position, where an image is transferred to the sheet. In order for the image to be properly positioned on the sheet, the sheet position (in both process direction and skew) needs to be within defined, desired specifications, even though the arrival position of the sheet at the image transfer position may be downstream from the two variable speed drive nips or other paper registration system providing the sheet to image registration. Typically, the position of the sheet is measured at an input location and a desired sheet trajectory is calculated. From that desired sheet trajectory, the desired nip velocities are calculated. That is, the average of the two nips will determine the process direction position correction and the differential velocity of the two nips will determine the skew registration correction. The compliance of the compliant drive nip causes the sheet velocity to be different from the imposed velocity by the drive nip. The ratio of actual paper velocity to the imposed velocity is known as the drive ratio. This drive ratio error effect will cause that desired paper trajectory to differ from the actual paper trajectory. This can lead to significant output registration errors that are outside of the defined, desired specifications. As a result, the sheet may not be sufficiently accurately aligned or overlaid with one or more print images.

For printing in general, providing sheet skewing rotation and sheet registration while the sheet is being fed forward in the printer sheet path is a technical challenge, especially as the sheet path feeding speed for systems increases. Print sheets are typically flimsy paper or plastic imageable substrates of varying thickness, stiffness, frictions, surface coatings, sizes, masses, and with various humidity conditions. Sheets of some with these various characteristics are particularly susceptible to feeder slippage, wrinkling, or tearing, especially when subject to excessive accelerations, decelerations, drag forces, path bending, and the like.

In addition to sheet lateral registration based on deliberate skew inducement and removal and TELER systems, there are other sheet side-shifting lateral registration systems, in which the entire structure and mass of a carriage containing the two drive rollers, their opposing nip idlers, and the drive motors (unless splined drive telescopically connected) are axially side-shifted to side-shift the engaged sheet into lateral registration. However, even in such systems, the sheet lateral registration movement can be done during the same time as, and independently of, the sheet deskewing movement. These may also be broadly referred to as TELER systems. For example, see U.S. Pat. No. 5,094,442 to Kamprath et al.

In various sheet registration systems, the use of sheet position sensors, such as a charge-coupled device (CCD) multi-element linear strip array sensor, may be used in a feedback loop for slip compensation to ensure the sheet achieves the desired three-axis registration. Sheet registration systems are operated and controlled by appropriate operation of conventional control systems. It is well known to program and execute imaging, printing, paper handling, and other control functions and logic with software instructions for processors, as taught by numerous prior patents and commercial products. Such software may, of course, vary depending on the particular functions, software type, and processor or other computer devices used, and may alternatively be implemented partially or fully in hardware using standard logic circuits or other designs.

Many sheet transport nips consist of a compliant drive wheel and a non-compliant idler wheel that is spring-loaded against the drive wheel. The compliance of this drive nip is known to cause a forward velocity error. U.S. Publication No. 2005/0263958 for Knierim et al., describes the measurement of sheet velocity from encoded non-compliant idler wheels. The Knierim method measured the actual surface velocity of the sheet without errors introduced by the compliance. Testing has revealed that the Knierim measurement method has systematic errors. One observed systematic error is caused by sheet thickness variations.

SUMMARY

Exemplary embodiments provide systems and methods to calibrate a sheet velocity measurement derived from a drive nip system incorporating idler encoders. Testing revealed that the velocity from a conventional idler encoder system is subject to systematic errors, such as errors that occur when the system is running media of different thicknesses. The system uses one or more nips with encoders mounted on the idlers and a number of point sensors that are spaced apart in the process direction. The point sensors are used to measure the transit time of the sheet (lead edge or trail edge) between two sensor positions. The transit time is used to calculate the average sheet velocity. The average sheet velocity is compared with the velocity derived from the idler encoders to derive a correction factor. The velocity sensors are used to calibrate the idler-encoder velocity sensors, providing a worthwhile improvement to idler-encoder technology for media handling (e.g., feeding, transport, and finishing) in direct marking systems.

One aspect is a xerographic system for calibration of sheet velocity measurement from encoded idler rolls, including two sensors, an encoded idler, and a controller. The two sensors sense a sheet in a media path. The encoded idler measures a velocity of the sheet. The controller measures a number of transit times of the sheet between two sensor positions, calculating an average sheet velocity from the transit times, and comparing the average sheet velocity with the measured velocity from the encoded idler to determine a correction factor, and adjusting a motor speed using the correction factor. The system may include a memory in communication with the controller for storing the transit times. The correction factor may be a ratio of the average sheet velocity over the measured velocity. The correction factor may be applied to the encoded idler measurement to predict a position of the sheet at a downstream location. The correction factor may be used by the controller to accurately position the sheet in a registration system. The correction factor may be used to determine a length measurement of the sheet. The system may include two drive nips, each drive nip associate with an encoded idler, where the drive nips execute a registration move to deliver the sheet to a registration location at a predetermined time with a predetermined orientation. The correction factor may be used to control a motor speed to accurately position the sheet.

Another aspect is a method for calibration of sheet velocity measurement from encoded idler rolls. Transit times of a sheet are measured between two sensor positions. An average sheet velocity is calculated from the transit times. The average sheet velocity is compared with a measured velocity from an encoded idler to determine a correction factor and a motor speed is adjusted using the correction factor. The transit times may be stored. The correction factor may be a ratio of the average sheet velocity over the measured velocity. The correction factor may be applied to the encoded idler measurement to predict a position of the sheet at a downstream location. The correction factor may be used by a controller to accurately position the sheet in a registration system. The correction factor may be used to determine a length measurement of the sheet. Yet another aspect is a computer-readable medium for storing instructions for performing this method.

DETAILED DESCRIPTION OF EMBODIMENTS

Figure 1:
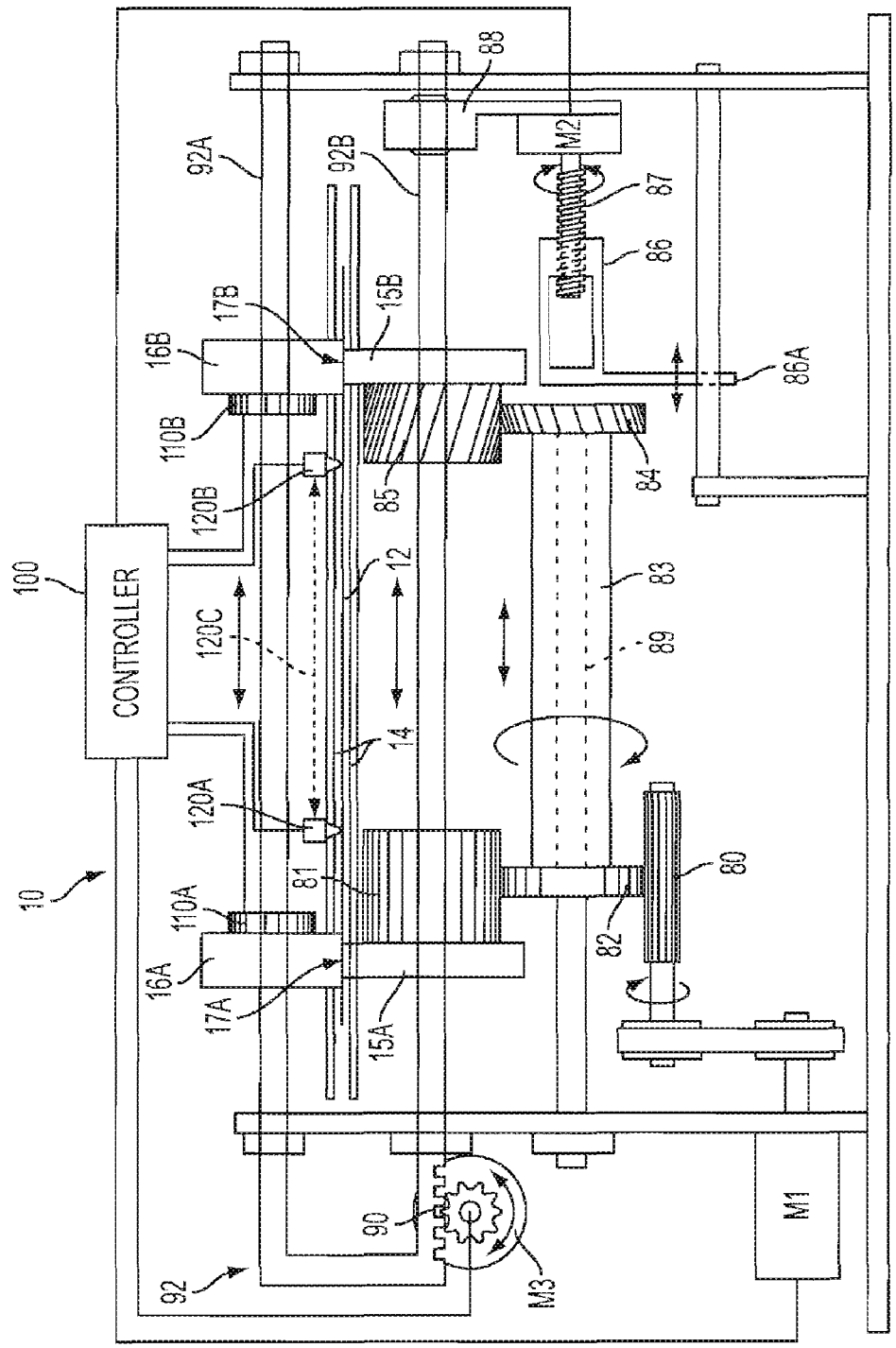
FIG. 1 illustrates a partially schematic transverse view, partially in cross-section for added clarity, of an exemplary embodiment of a sheet registration system with a dual nip automatic differential deskewing system in an exemplary printer paper path.

FIG. 1 from U.S. Publication No. 2005/0263958 for Knierim et al. shows an exemplary embodiment of a registration system 10 providing automatic sheet deskewing and sheet process direction registration. As described above, various sheet registration/deskewing systems may be installed in a selected location or locations of the paper path or paths of various xerographic devices, especially high speed reproduction machines, for rapidly deskewing and otherwise registering a sequence of print media sheets 12 without having to stop the sheets and without having to damage sheet edges by contacting obstructions, as taught by the above cited and other related art. Only a portion of some exemplary baffles 14 partially defining an exemplary printer paper path is illustrated in FIG. 1.

The registration system 10 in this example has a positive sheet 12 drive in the process direction from two laterally spaced frictional elastomeric surface sheet drive rollers 15A, 15B and mating idler rollers 16A, 16B forming first and second drive nips 17A, 17B. A single servo or stepper motor M1 sheet drive here is positively driving both sheet feeding nips 17A, 17B. Differential actuator drive motor M2 provides sheet deskewing by differential rotation of driver roller 15A relative to 15B and a motor M3 optionally provides lateral sheet registration with the same integrated system 10.

The two drive nips 17A, 17B are driven at substantially the same rotational speed to feed the sheet 12 in those nips downstream in the paper path at the desired forward process speed and in the correct process registration position, except when the need for deskewing the incoming sheet 12 is detected by the above-cited or other conventional optical sensors, such as 120A, 120B in the sheet path. That is, when the sheet 12 has arrived in the system 10 in an initially detected undesired skewed orientation. In that case, a corresponding pitch change by small rotary positional changes provides driving difference between the two driver rollers 15A, 15B is made during the time the sheet 12 is passing through and held in the two sheet feeding nips 17A, 17B. This accomplishes the desired sheet deskew (skew correction) by a partial sheet rotation. In this particular system 10 only a single servo motor M1 is needed to positively drive both drive rollers 15A, 15B, even though their respective forward driving differs slightly to provide differential sheet rotation in the nips 17A, 17B for sheet deskew.

As shown in FIG. 1, the motor M1 provides both of the nips 17A, 17B drives is driving a gear 80 via a timing belt. This elongated straight gear 80 drivingly engages a straight gear 82, which in turn drivingly engages a straight gear 81. The gear 81 is directly connected to the sheet drive roller 15A, defining the first drive nip 17A. Both gear 81 and its connected sheet drive roller 15A are freely rotatably mounted on a mounting shaft 89, which can translate but does not need to rotate. The straight gears 80 and 81 have enough lateral (axial) teeth extension so that the gear 82 and its shafts 83 and 89 are able to move laterally relative to the gears 81 and 80 and still remain engaged.

At the other end of this same hollow drive shaft 83, which is being indirectly but positively rotatably driven by the motor M1 via gears 80 and 82, there is mounted a helical gear 84, which thus rotates with the rotatable drive of the gear 82. This helical gear 84 drivingly engages another helical gear 85, which is fastened to the drive roller 15B of the second nip 17B to rotatably drive them rotating on the shaft 92B. Thus, absent any axial movement of the shafts 83 and 89, the motor M1 is positively driving both of the sheet nips 17A and 17B with essentially the same rotational speed to provide essentially the same sheet 12 forward movement. The hollow drive shaft 83 is providing a laterally translatable tubular drive connecting member between the two gears 82 and 84 and thus the two gears 81, 85 and thus the two drive rollers 15A, 15B to form part of the differential drive deskewing system.

The desired amount of deskew is provided in this example by slightly varying the angular position of the nip 17B relative to the nip 17A for a predetermined time period by the deskewing differential drive system. In FIG. 1, the particular differential drive system is powered by intermittent rotation of a deskew motor M2 controlled by the controller 100. The deskew motor M2 is fastened to the shaft 92B by a connector 88 and thus moves laterally therewith. When the deskew motor M2 is actuated by the controller 100, it rotates its screw shaft 87. The screw shaft 87 engages with its screw threads, the mating threads of a female nut 86, or other connector, such that rotation of the screw shaft 87 by the motor M2 moves the shaft 89 (and thus hollow shaft 83) axially towards or away from the motor M2, depending on the direction of rotation of its screw shaft 87. A relatively small such axial or lateral movement of the shaft 83 moves its two attached gears 82 and 84 laterally relative to the opposing shaft 92B on which is mounting the drive rollers 15A, 15B and their respective gears 81 and 85. The straight gear 82 can move laterally relative to its mating straight gear 81, without causing any relative rotation. However, in contrast, the translation of the mating helical gear connection between the gears 84 and 85 causes a rotational shift of the nip 17B relative to the nip 17A. That change (difference) in the nips rotational positions is in proportion to, and corresponds to, the amount of rotation of the screw shaft 87 by the deskew motor M2. This provides the desired sheet deskew. Reversal of the deskew motor M2 when a sheet is not in the nips 17A, 17B can then re-center the deskew system, if desired.

The female nut 86 provides spacing for substantial unobstructed lateral movement of the end of the screw shaft 87 therein as the screw shaft 87 rotates in the mating threads of the nut 86. The nut 86 also has an anti-rotation arm 86A, which can slideably engage a bar or other fixed frame member with a linear brushing between the end of the anti-rotation arm 86A and that stationary member. Thus, the nut 86 does not need a rotary bearing to engage and move the non-rotating center shaft 89, and can be fastened thereto. Of course, alternatively, if desired, it could move the rotating outer tubular connecting shaft 83 laterally through a rotary bearing.

Turning now to the integral lateral or sideways to process direction sheet registration system of this particular TELER registration system 10, components move laterally for sheet lateral registration to be mounted on a unit 92 comprising parallel upper and lower arms of shafts 92A and 92B. In FIG. 1, nips lateral translation unit 92 of shafts 92A and 92B appears u-shaped or trombone slide-shaped, but that is not essential. Shafts 92A and 92B are non-rotating shafts that may be laterally slideably mounted through the frames of the overall unit 10, as is also the left end of the parallel shaft 89.

The lateral (side-shifting) movement imparted to the unit 92 is from the motor M3 driving the unit 92 via a rack and gear drive 90. The amount of lateral sheet 12 shifting here is thus controlled by the controller 100 controlling the amount of rotation of the motor M3. But the motor M3 itself is not part of the laterally moving mass. It is stationary and fixed to the machine frame.

The nip 17A, 17B idlers 16A and 16B are freely rotatable on the transverse upper arm or shaft 92A, but are also mounted to move laterally when the unit 92 is so moved by the motor M3. Likewise, the gear 81 and its connecting driver roller 15A and the gear 85 and its connecting drive roller 15B are freely rotatable relative to the lower arm or shaft 92B, but mounted to move laterally when that arm or shaft 92B is moved laterally by the motor M3 gear drive 90. Because the upper and lower shafts 92A and 92B are parallel and are fastened together into a single slide unit 92, the drive rollers 15A and 15B will move laterally by the same amount as the idlers 16A, 16B to maintain, but laterally move, the two nips 17A, 17B.

Also attached to move laterally with the unit 92 is a coupling 88 mounting the deskew motor M2 to the lower arm 92B so that the lateral sheet registration movement of the unit 92 also laterally moves the motor M2 its screw shaft 87, and thus the shaft 89, via its coupling 86.

Thus it may be seen that the drive nips 17A and 17B and their deskew system can all be laterally shifted for lateral sheet registration without changing either the forward sheet speed and registration or the sheet deskewing positions while the lateral sheet registration is accomplished. That is, the deskewing operation controlled by the motor M2 is independent of the lateral registration movement provided by the motor M3. This allows all three registration movements of the sheet 12 to be desirably accomplished simultaneously, partially overlapping in time, or even separately. Yet neither the mass of the drive motor M1 or the mass of the lateral registration drive M3 need be moved for lateral sheet registration. Both may be fixed position motors.

Note, however, the various alternative sheet deskewing system embodiments of other above-cited and other related art. In addition, it will be appreciated that some components may be vertically reversed in position, such as having the idlers mounted below the paper path and the two drive rollers mounted above the paper path.

Turning now from the related art registration system of FIG. 1 to the exemplary embodiments of the present invention, which include systems and methods to calibrate a sheet velocity measurement derived from a drive nip system incorporating idler encoders. Testing revealed that the velocity from a conventional idler encoder system, such as that shown in FIG. 1, is subject to systematic errors, such as errors that occur when the system is running media of different thicknesses. These systematic errors in measuring the velocity of the sheet may cause position predictions to be off so that positioning and deskewing fail and an image appears skewed on the page. With accurate velocity measurement, calibration or control feedback may be used to control delivery of the sheet to the right place at the right time. Exemplary embodiments of a system use one or more nips with encoders mounted on the idlers mid a number of point sensors that are spaced apart in the process direction. The point sensors are used to measure the transit time of the sheet (lead edge or trail edge) between two sensor positions. The transit time is used to calculate the average sheet velocity. The average sheet velocity is compared with the velocity derived from the idler encoders to derive a correction factor. The velocity sensors may be used to calibrate the idler-encoder velocity sensors.

Figure 2:
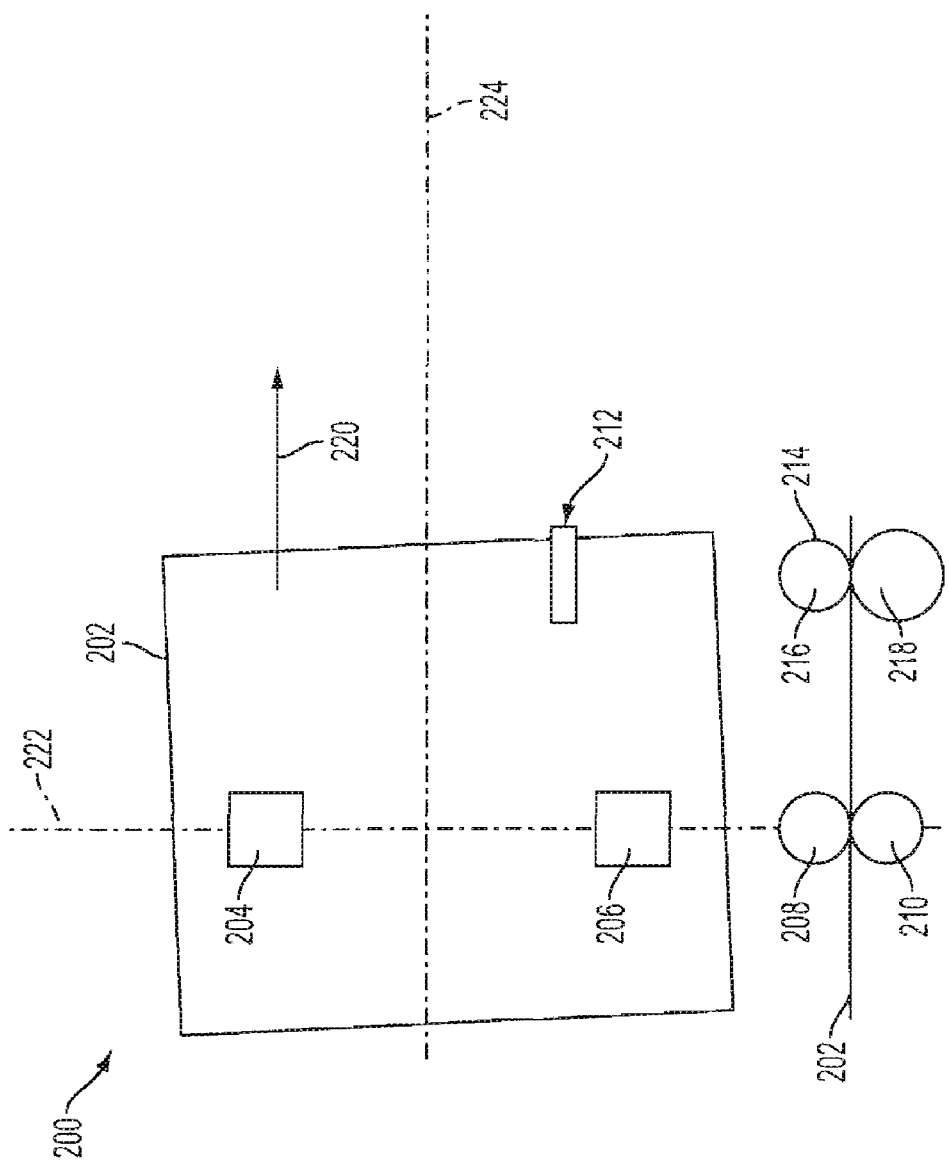
FIG. 2 illustrates a block diagram of an exemplary configuration of nips used in the transport of a sheet in a media path.

FIG. 2 illustrates an exemplary configuration 200 of nips used in the transport of a sheet 202 of media in a media path. The sheet 202 is driven by a pair of drive nips 204, 206. One of the wheels 208, 210 of the nip is the driven nip 210, which has a compliant rubber layer. The other wheel (idler) 208 is made out of a non-compliant material (e.g., plastic, delrin) and is spring-loaded to provide the normal force. Added to this transport is a measurement nip 212. An encoder 214 is mounted on a non-compliant (idler) wheel 216. The other wheel 218 may be either compliant or non-compliant. In the case that the measurement nip 212 is a drive nip, the drive nip is usually compliant as to avoid damage to the sheet 202. The encoder 214 on the non-compliant idler 216 measures the angular velocity of the idler. Multiplication of the angular velocity by the idler radius yields a surface velocity measurement 220 of the sheet 12 relative to the x-axis 224 and y-axis 222. The sheet velocity has an error in it so that the velocity being imparted to the sheet 222 by the drive nips 204, 206 is not necessarily the sheet velocity 220. Eccentricity of the drive components may also cause a sheet velocity 220 variation.

U.S. Publication No. 2005/0263958 for Knierim et al. discloses encoders 110A, 110B mounted to the idlers 16A, 16B of a pair of nips 17A, 17B that perform the sheet registration function (see FIG. 1). The accurate measurement of sheet motion by the Knierim method resulted in improved registration performance. However, recently, experimental testing revealed that sheet properties cause systematic variation in the velocity measurement from the encoded idler sheer 16A, 16B. One observed property causing a systematic variation was sheet thickness variation, but other properties like sheet stiffness and the like may cause systematic variation in the velocity measurement as well.

Figure 3:
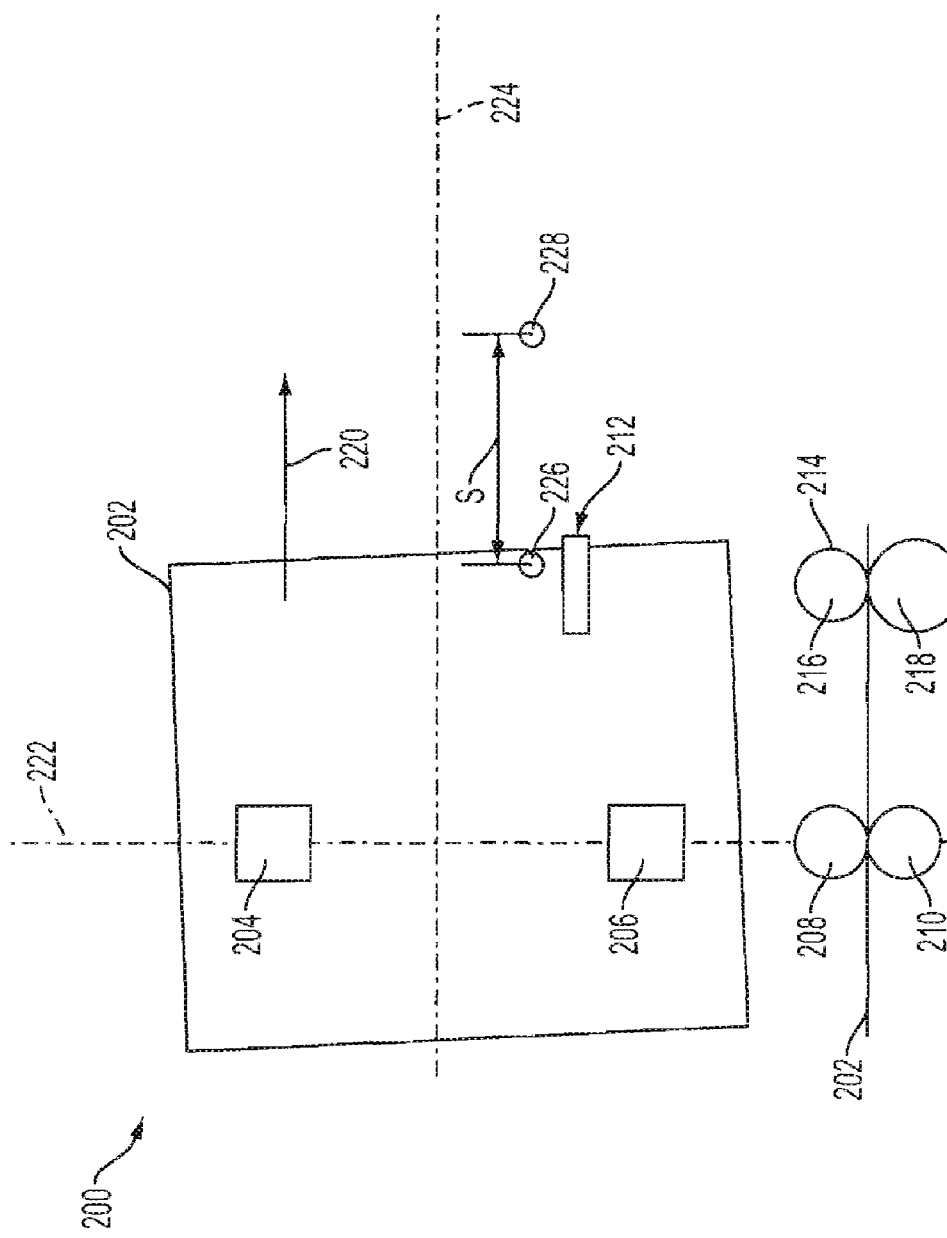
FIG. 3 illustrates another exemplary configuration of nips used in the transport of a sheet of media in a media path.

FIG. 3 illustrates another exemplary configuration 200 of nips used in the transport of a sheet 202 of media in a media path. FIG. 3 includes the addition of two or more point sensors 226, 228 that enable accurate measurement of sheet velocity. FIG. 3 shows two sensors 226, 228 spaced a distance, S, apart and mounted in the vicinity of the encoder idler wheel 214. An encoder idler wheel 214 is a backup wheel that rolls on the paper against the drive roller with encoder to measure the velocity. The drive roller may be either hard or soft, but the encoder idler has a hard cylindrical surface so that it does not deform when it touches the paper so that it accurately measures the surface velocity of the sheet 202. The encoder idler wheel 214 provides a pulse train of signals that is a function of the angular velocity of the idler. One kind of encoder that may be used is a rotary digital encoder. To control the velocity of the sheet 202 with a controller 100, continuous feedback of the velocity is needed. The time interval, T, of the sheet lead edge traveling the distance S from sensor 226 to sensor 228 is measured. A sheet velocity V1 is computed from $V1=S/T$.

The encoder 214 on the idler wheel 216 measures the angular velocity. An average velocity V2 is calculated over the interval T. The ratio $C=V1/V2$ is computed as a correction factor to sheet velocity measurement (v2) from the encoded idler 214, 216 to get an accurate sheet velocity measurement. This correction factor, C, may be used by devices downstream (i.e., by registration controller 100 of FIG. 1) that use an encoded idler wheel 214, 216. Alternatively, the calibration factor, C, may be experimentally determined in a separate test apparatus (See FIG. 4) for different sheet types. Then, the calibration factor, C, may be stored in memory associated with the registration system and retrieved when a particular type of sheet is used. Averaging over many sheets of the same type will improve the accuracy of the correction factor, C. Note that the sensors 226, 228 may be located upstream of measurement nip 212 in other embodiments. In those embodiments, trail edge measurements may be used for the calibration. The calibration may be done at various times or once, e.g., when the sheet registration system is manufactured. Calibration data may be stored in a memory associated with the sheet registration system, e.g., in the controller 100. Alternatively, calibration may be done during startup or during the sheet registration or printing process or continuously or periodically.

Once the calibration is performed, the calibration data may be used to determine the actual sheet velocity so that the sheet registration system may accurately position the sheet to the desired location. For example, a thick piece of paper that is moving a little too slowly may be fed through the registration system more quickly. The calibration may be used to control a motor that drives the sheet to adjust to a particular speed. This may be done through the controller 100 of FIG. 1 or another controller, such as a motor controller. For example, the motor may be adjusted to either increase or decrease the speed based on the measured velocity of the sheet.

Figure 4:
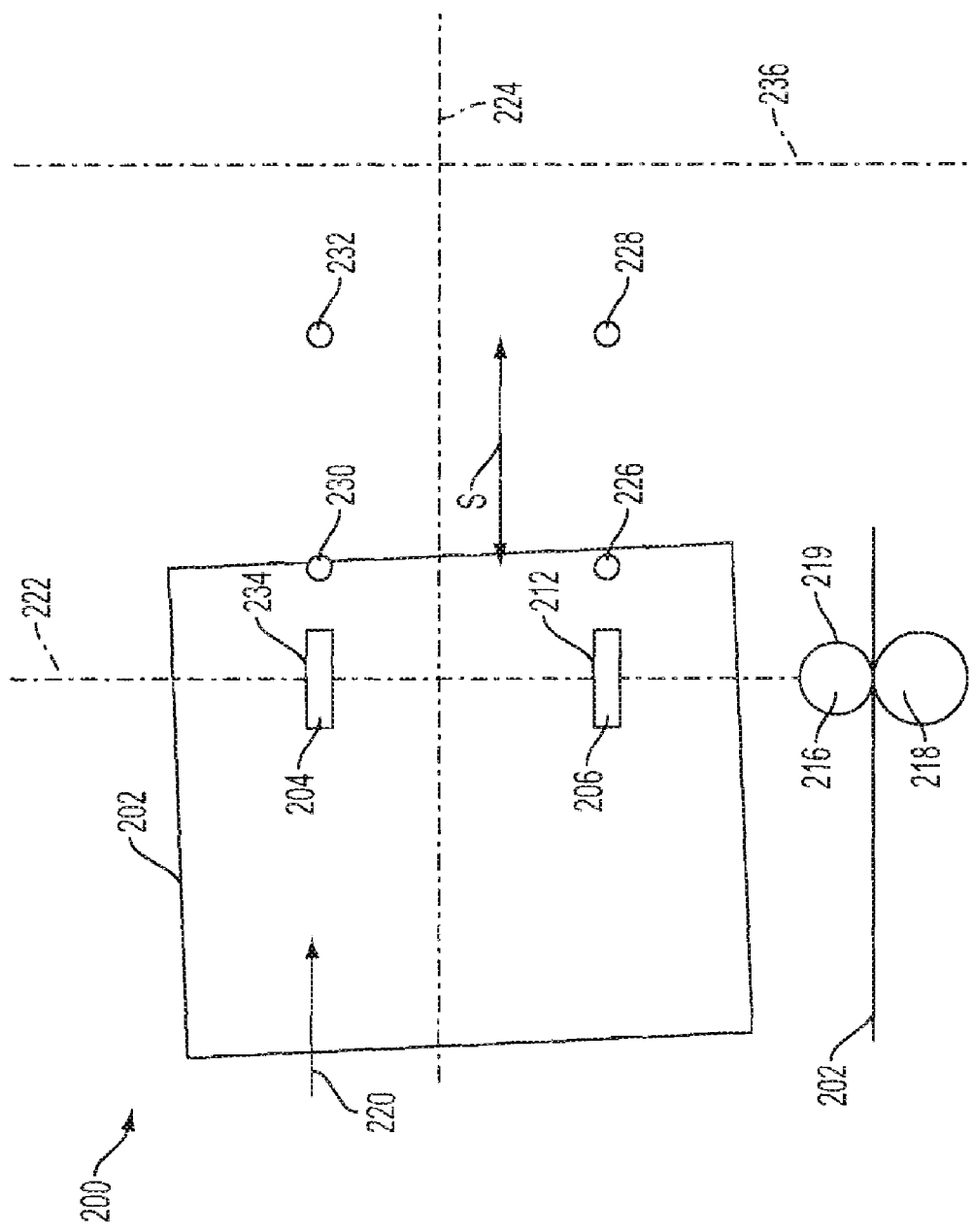
FIG. 4 illustrates yet another exemplary configuration of nips used in the transport of a sheet of media in a media path

FIG. 4 illustrates yet another exemplary configuration 200 of nips used in the transport of a sheet 202 of media in a media path. FIG. 4 includes four point sensors 226, 228, 230, 232 that enable accurate measurement of sheet velocity. The drive nips 212, 234 execute a registration move to deliver the sheet to a registration location 236 at a desired time with a desired orientation. The nips 212, 234 have encoded idler wheels 214, 216 for measuring velocities V2$i$ and V2$o$, which are used to accurately move the sheet. To calculate a calibration factor:

(1) The encoder idler velocities are averaged over an interval in which the leading edge (LE) of the sheet 202 is in between sensors 226, 228 to give a velocity V2;

(2) The time interval Ti between the sheet leading edge (LE) arriving at sensor 230 and sensor 232 and the time interval To (from 226 and 228) are stored. From the sensor spacing (sensors 226 and 230), the average velocities V1$i$ and V1$o$ may be calculated. Their combination yields $V1=0.5*(V1i+V1o)$.

(3) Then, the correction factor is obtained as $C=V1/V2$.

After the sheet LE is downstream of sensors 228 and 232, the correction factor may be applied to the encoded idler velocity measurement to accurately predict the position of the LE. In turn, this information may also be used by the registration controller 100 to accurately position the sheet.

In exemplary embodiments, the sensors may also be located upstream of the registration nips. Exemplary embodiments may be applied to various encoded idlers for sheet length measurement to obtain a corrective factor for sheet length measurement. The two sensors 228 and 232 in FIG. 4 may be replaced by a single sensor located on the x-axis 222. This would have a minor influence on the accuracy, while being cost-effective. The sensors may be located before or after the nips. If a single sensor is not located on the x-axis 222, a LE tracking algorithm using encoded idler information may be used. The LE tracking algorithm predict the time at which the sheet LE sensor arrives at the single sensor. Let dt2 be the predicted time interval between the sheets arriving at the single sensor and arriving at sensor 226 or 228 of FIG. 4. The ratio of the measured interval dt1 and dt2 provide the correction factor C.

Figure 5:
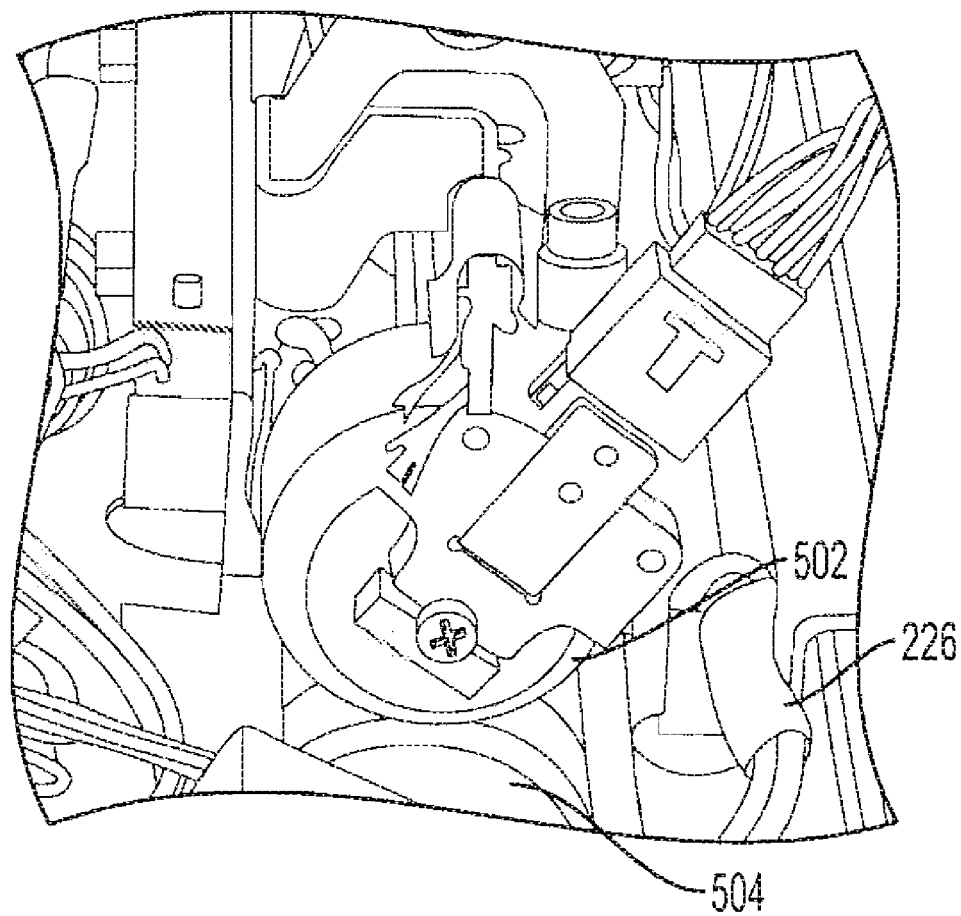
FIG. 5 illustrates an exemplary embodiment of a drive nip/idler apparatus used in sheet registration systems.

FIG. 5 shows an exemplary embodiment of a drive nip/idler apparatus used in sheet registration systems. Experiments were performed on the test apparatus. FIG. 5 shows detail of one of the nips. Point sensor 226 is illustrated but the second sensor 228 is not shown; it would be about 100 mm downstream. The test apparatus also includes an encoder disc 502 and drive nip with rubber layer 504. The other nip (not shown) would have a similar arrangement.

Figure 6:
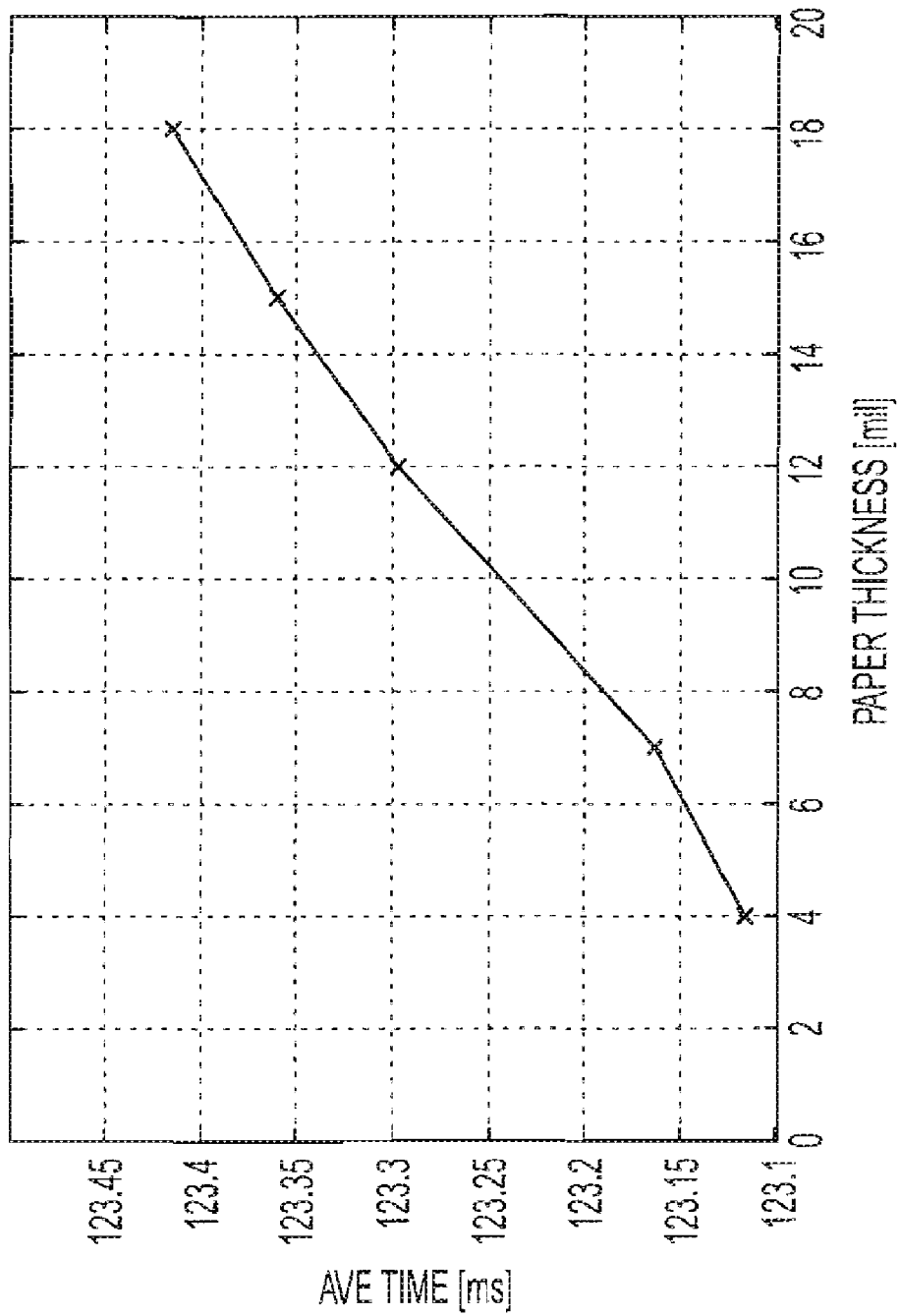
FIG. 6 illustrates exemplary test data of the measured average time interval between sensors as a function of sheet thickness.
Figure 7:
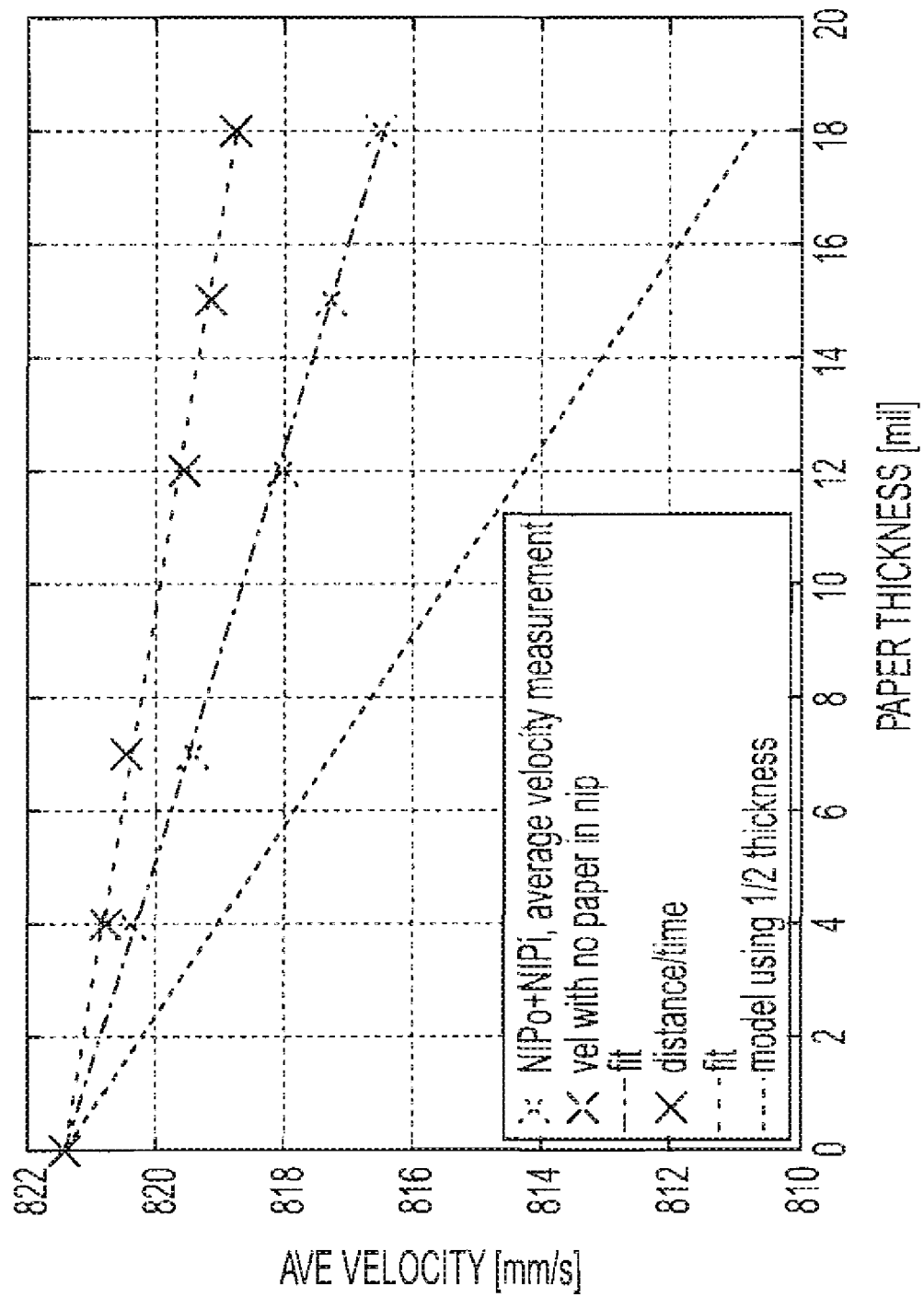
FIG. 7 illustrates exemplary test data for average velocities.

In the experimental testing, five sets of sheets were fed through the test apparatus for measurement. Table 1 shows the thickness of the sheets for each set. Data was averaged in each set. FIG. 6 shows the measured average time interval between the sensors as a function of sheet thickness. The values of this graph were used to calculate the average velocity (i.e., distance between sensors/time). The values are shown in FIG. 7 (i.e., top curve shows data points with straight line fit). FIG. 7 also shows the average encoder idler velocities (i.e., middle curve with straight line fit). The bottom curve shows a model in which ½ of the sheet thickness is added to the encoder idler radius to predict the measured velocity. This model was inadequate in the experimental testing.

TABLE 1

| Set | Thickness | Number of Sheets |
|---|---|---|
| 1 | 4 milliinches | 29 |
| 2 | 7 milliinches | 17 |
| 3 | 12 milliinches | 22 |
| 4 | 15 milliinches | 18 |
| 5 | 19 milliinches | 14 |

The following exemplary embodiment of a method of estimating the true sheet velocity V1 may be used. In the following equations, V0 is the velocity for 0 sheet thickness, b is the sheet thickness, and a1 and a2 are the slopes of the straight line fit.

$$V1 = V0 - a1*b$$

$$V2 = V0 - a2*b; \text{ and}$$

$$V1 = V2 - (a1-a2)*b.$$

This enables estimation of the true sheet velocity V1 from encoded idler measurements, V2. Note that this calibration may be done for each sheet or calibration may be obtained from a separate test apparatus. In addition, the above example used sheet thickness as the property for which calibration was performed. Other properties, such as stiffness, etc. may also influence actual sheet velocity. The calibration may be performed for each of a number of paper types, each type having particular properties.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A xerographic system for calibration of sheet velocity measurement from encoded idler rolls, comprising:
   two sensors for sensing a sheet in a media path;
   an encoded idler for measuring a velocity of the sheet; and
   a controller for measuring a plurality of transit times of the sheet between the two sensor positions, calculating an average sheet velocity from the transit times, and comparing the average sheet velocity with the measured velocity from the encoded idler to determine a correction factor.

2. The xerographic system of claim 1, further comprising: a memory in communication with the controller for storing the transit times.

3. The xerographic system of claim 1, wherein the correction factor is a ratio of the average sheet velocity over the measured velocity.

4. The xerographic system of claim 1, wherein the correction factor is applied to the encoded idler measurement to predict a position of the sheet at a downstream location.

5. The xerographic system of claim 1, wherein the correction factor is used by the controller to accurately position the sheet in a registration system.

6. The xerographic system of claim 1, wherein the correction factor is used to determine a length measurement of the sheet.

7. The xerographic system of claim 1, further comprising two drive nips, each drive nip associated with an encoded idler, the drive nips executing a registration move to deliver the sheet to a registration location at a predetermined time with a predetermined orientation.

8. The xerographic system of claim 1, wherein the correction factor is used to adjust a motor speed to accurately position the sheet.

9. A method for calibration of sheet velocity measurement from encoded idler rolls, comprising:
   measuring a plurality of transit times of a sheet between two sensor positions;
   calculating an average sheet velocity from the transit times; and
   comparing the average sheet velocity with a measured velocity from an encoded idler to determine a correction factor.

10. The method of claim 9, further comprising: storing the transit times.

11. The method of claim 9, wherein the correction factor is a ratio of the average sheet velocity over the measured velocity.

12. The method of claim 9, wherein the correction factor is applied to the encoded idler measurement to predict a position of the sheet at a downstream location.

13. The method of claim 9, wherein the correction factor is used by a controller to accurately position the sheet in a registration system.

14. The method of claim 9, wherein the correction factor is used to determine a length measurement of the sheet.

15. A computer-readable medium for storing instructions for performing a method for calibration of sheet velocity measurement from encoded idler rolls, the method comprising:
   measuring a plurality of transit times of a sheet between two sensor positions;
   calculating an average sheet velocity from the transit times; and
   comparing the average sheet velocity with a measured velocity from an encoded idler to determine a correction factor.

16. The computer-readable medium of claim 15, further comprising: storing the transit times.

17. The computer-readable medium of claim 15, wherein the correction factor is a ratio of the average sheet velocity over the measured velocity.

18. The computer-readable medium of claim 15, wherein the correction factor is applied to the encoded idler measurement to predict a position of the sheet at a downstream location.

19. The computer-readable medium of claim 15, wherein the correction factor is used by a controller to accurately position the sheet in a registration system.

20. The computer-readable medium of claim 15, wherein the correction factor is used to determine a length measurement of the sheet.

* * * * *